(12) United States Patent
Lin

(10) Patent No.: US 11,979,825 B2
(45) Date of Patent: May 7, 2024

(54) METHOD AND SYSTEM FOR CONTROLLING GATEWAY, AND ELECTRONIC DEVICE

(71) Applicant: BEIJING XIAOMI MOBILE SOFTWARE CO., LTD., Beijing (CN)

(72) Inventor: Bing Lin, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 215 days.

(21) Appl. No.: 17/330,306

(22) Filed: May 25, 2021

(65) Prior Publication Data

US 2022/0150817 A1 May 12, 2022

(30) Foreign Application Priority Data

Nov. 6, 2020 (CN) .......................... 202011233256.9

(51) Int. Cl.
*H04W 48/20* (2009.01)
*H04B 17/318* (2015.01)
*H04W 4/80* (2018.01)

(52) U.S. Cl.
CPC .......... *H04W 48/20* (2013.01); *H04B 17/318* (2015.01); *H04W 4/80* (2018.02)

(58) Field of Classification Search
CPC ......... H04W 48/20; H04W 4/80; H04W 4/70; H04W 4/06; H04W 84/18; H04B 17/318; H04L 41/0823; H04L 43/0817; H04L 67/2885; H04L 67/56; H04L 41/0806; H04L 12/66
See application file for complete search history.

(56) References Cited

U.S. PATENT DOCUMENTS

| 2008/0130630 | A1* | 6/2008 | Shim | H04L 12/66 370/352 |
| 2019/0021016 | A1* | 1/2019 | Radmand | H04L 43/08 |
| 2019/0349252 | A1* | 11/2019 | Hu | H04L 63/0876 |
| 2019/0357043 | A1 | 11/2019 | Hu | |
| 2020/0068656 | A1* | 2/2020 | Yang | H04W 40/24 |
| 2021/0410116 | A1* | 12/2021 | Zhang | H04W 24/02 |

FOREIGN PATENT DOCUMENTS

| CN | 107547521 A | 1/2018 |
| CN | 110913453 A | 3/2020 |

OTHER PUBLICATIONS

European Patent Application No. 21176567.2 extended Search and Opinion dated Oct. 18, 2021, 9 pages.
Chinese Patent Application No. 202011233256.9, Office Action dated Mar. 16, 2022, 7 pages.
Chinese Patent Application No. 202011233256.9, English translation of Office Action dated Mar. 16, 2022, 9 pages.

* cited by examiner

*Primary Examiner* — Natasha W Cosme
*Assistant Examiner* — Yewon Kim
(74) *Attorney, Agent, or Firm* — COZEN O'CONNOR

(57) ABSTRACT

A method for controlling a gateway, and a system for controlling a gateway implementing the method, comprises: determining a gateway for acting as an agent of a sub-device from at least one gateway as an agent gateway, controlling the agent gateway to act as the agent of the sub-device by sending a first control instruction to the agent gateway and forbidding at least one other gateway to act as the agent of the sub-device by sending a second control instruction to the at least one other gateway.

14 Claims, 3 Drawing Sheets

METHOD AND SYSTEM FOR CONTROLLING GATEWAY, AND ELECTRONIC DEVICE

CROSS-REFERENCE TO RELATED APPLICATIONS

This application claims the benefit of priority to Chinese Application No. 202011233256.9, filed on Nov. 6, 2020, the contents of which are incorporated herein by reference in their entirety.

TECHNICAL FIELD

The present disclosure relates to a field of communication technology, and more particularly, to a method for controlling a gateway, a system for controlling a gateway, and an electronic device.

BACKGROUND

With the development of technology, the wireless networking technology based on Internet of Things has been applied in various fields. The wireless networking technology for example includes Bluetooth Mesh protocol, Zigbee protocol, Thread protocol and so on. For example, the wireless networking technology based on Internet of Things can be applied in smart home. A topology with the Bluetooth Mesh protocol applied in the smart home generally includes a gateway, a sub-device and a server.

SUMMARY

It is desired to provide a method for controlling a gateway, an apparatus for controlling a gateway, a system for controlling a gateway, an electronic device, and a storage medium.

According to a first aspect of embodiments of the present disclosure, there is provided a method for controlling a gateway. The method includes: determining a gateway for acting as an agent of a sub-device from at least one gateway as an agent gateway, controlling the agent gateway to act as the agent of the sub-device by sending a first control instruction to the agent gateway and forbidding at least one other gateway to act as the agent of the sub-device by sending a second control instruction to the at least one other gateway.

According to a second aspect of embodiments of the present disclosure, there is provided a system for controlling a gateway. The system includes at least one gateway and a server. The at least one gateway is configured to receive status information broadcasted by a sub-device and forward the status information to the server. The server is configured to determine a gateway for acting as an agent of the sub-device from the at least one gateway as an agent gateway, control the agent gateway to act as the agent of the sub-device by sending a first control instruction to the agent gateway and forbidding at least one other gateway to act as the agent of the sub-device by sending a second control instruction to the at least one other gateway.

According to a third aspect of embodiments of the present disclosure, there is provided an electronic device, including a processor, a memory and computer program stored on the memory and capable of running on the processor. When the processor is configured to execute the computer program, the method described in the first aspect is implemented.

BRIEF DESCRIPTION OF THE DRAWINGS

These and other aspects of embodiments of the present disclosure will become apparent and more readily appreciated from the following descriptions made with reference to the drawings, in which.

DETAILED DESCRIPTION

Figure 1:
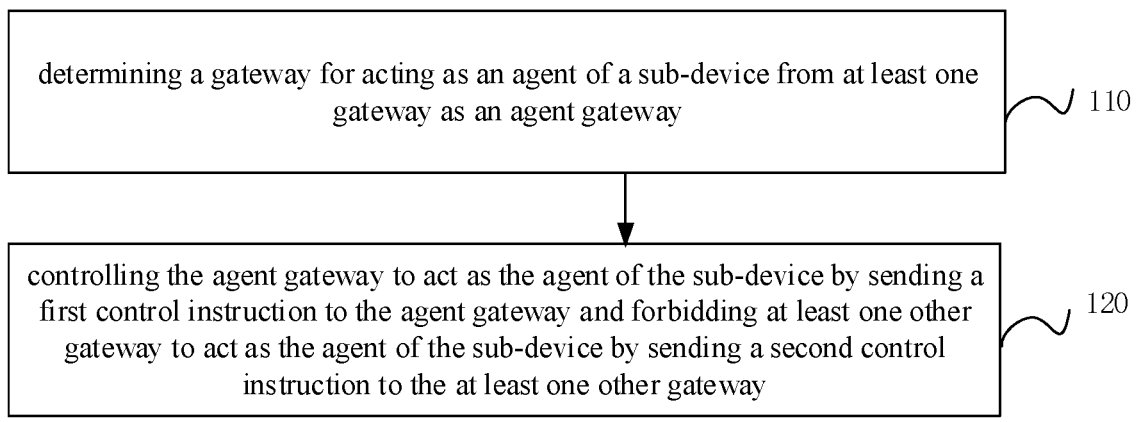
FIG. 1 is a flowchart of a method for controlling a gateway according to an embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. Further, it should be noted that for ease of description, only parts related to the present disclosure are shown in the drawings.

The solutions of the embodiments of the present disclosure are clearly and completely described below with reference to the accompanying drawings in the embodiments of the present disclosure. Obviously, the described embodiments are merely part of rather than all of the embodiments of the present disclosure. All other embodiments obtained by persons of ordinary skill in the art based on the embodiments of the present disclosure without making creative efforts shall fall within the protection scope of the present disclosure.

Terms such as "first", "second", "third" and "fourth" (if exits) in the specification, claims and drawings are only used for distinguishing one element from another element without necessarily requiring or implying any specific order or sequence. It should be understood that these terms may be exchanged in suitable situations, such that the order of execution of the embodiments described in the present disclosure may differ from that which is shown or depicted herein.

As used herein, the terms "comprises," "comprising," "includes," "including," "has," "having" or any other variation thereof, are intended to cover a non-exclusive inclusion. In some embodiments, a process, method, system, product, or apparatus that comprises a list of steps or modules is not necessarily limited only those steps or modules but may include other steps or modules not expressly listed or inherent to such process, method, product, or apparatus.

It should be noted that, in the present disclosure, the disclosed embodiments and the features of the disclosed embodiments may be combined under conditions without conflicts. The present disclosure will be described in detail with reference to the following drawings and embodiments.

With the development of technology, the wireless networking technology based on Internet of Things has been applied in various fields. The wireless networking technology for example includes Bluetooth Mesh protocol, Zigbee protocol, Thread protocol and so on. For example, the wireless networking technology based on Internet of Things can be applied in smart home. A topology with the Bluetooth Mesh protocol applied in the smart home generally includes a gateway, a sub-device and a server. The gateway and the sub-device are connected through Bluetooth Mesh, and the gateway and the server are connected through the internet. A control instruction sent by the server may be sent to the sub-device through the gateway, and a message returned from the sub-device may also be sent to the server through the gateway.

In the related art, the message is transmitted between the gateway and the sub-device by flooding. All devices in the Bluetooth Mesh network are equal, i.e., when the smart home includes multiple gateways and multiple sub-devices, these gateways and sub-devices are equal. When a user would like to control one sub-device, the control instruction sent by the server is sent to all the gateways, all the gateways may receive the control instruction and forward the control instruction to each sub-device. After receiving a message, the sub-device may determine whether the message is directed to itself, if yes, the sub-device may process it, otherwise, the sub-device may forward it. When the sub-device receives a reply message, all the gateways may receive the reply message and forward it to the server.

The above method causes increased amount of messages transmitted in the Bluetooth Mesh network and further increased resource consumption of the server.

In the related art, messages are transmitted between a gateway and a sub-device by flooding. A control instruction sent from a server may be forwarded by multiple gateways to the same sub-device simultaneously, and a reply message of the sub-device may be transmitted to the multiple gateways and forwarded to the server, which increases the amount of messages transmitted in the Bluetooth Mesh network. The Bluetooth Mesh network is sensitive to the amount of messages in the network. Increased amount of messages may cause cyber storm, reduce a success rate of transmitting effective messages, further may affect the 2.4G wireless environment and wireless protocols operating on the 2.4G such as Wi-Fi, Zigbee and so on. Meanwhile, when transmitting messages by flooding, resource consumption (such as throughput capacity, request quantity, concurrent quantity or the like) of the server may be increased. Both the number of control instructions sent from any server and the number of reply messages of the sub-devices are directly proportional to the number of gateways, but some of the control instructions and the reply messages are redundant.

In view of the above problems, the present disclosure aims to provide a method for controlling a gateway, in which only one gateway processes interactions between the server and the sub-device, such that the amount of messages transmitted in the Bluetooth Mesh network is reduced and the resource consumption of the server is decreased.

The inventive method may be applied in a server which controls a sub-device via a gateway in the Internet of Things. The server may be a cloud server, or a common server. In the following embodiments, the cloud server is taken as the server, for example.

It should be noted that, an execution subject of the method for controlling a gateway according to the embodiment of the present disclosure may be an apparatus for controlling a gateway, which may be implemented as a part or all of a server in software, hardware or combination thereof. In the following embodiment, for example, a cloud server is taken as the execution subject.

With reference to FIG. 1, a flowchart of a method for controlling a gateway according to an embodiment of the present disclosure is shown.

As illustrated in FIG. 1, the method may include the following.

At block S110, a gateway for acting as an agent of a sub-device is determined from at least one gateway as an agent gateway.

At block S120, the agent gateway is controlled to act as the agent of the sub-device by sending a first control instruction to the agent gateway, and at least one other gateway is forbidden to act as the agent of the sub-device by sending a second control instruction to the at least one other gateway.

Gateway is a stage-gate through which a network is connected to another network. In the internet, the gateway is an intermediate device used to connect intranet and other networks on the internet, which may be also called as a "router". In the embodiment, the gateway may control a sub-device in the Internet of Things through interactions, for example, using a smart speaker. The Internet of Things may include at least one gateway, and the sub-device may be a controlled object in the Internet of Things, such as a smart lamp, a smart switch and so on.

The agent gateway refers to a gateway which acts as an agent of a sub-device. If the agent gateway acts as the agent of the sub-device, then interactions between the server and the sub-device can be processed by the agent gateway merely.

The gateway for acting as the agent of the sub-device is determined from the at least one gateway as the agent gateway, for example, by specifying any gateway in the at least one gateway as the agent gateway or by determining one of the at least one gateway as the agent gateway in other ways, for example in the way described in any of the following embodiments.

When the cloud server determines one agent gateway for acting as the agent of the sub-device from the at least one gateway, the cloud server sends a message "allow to act as the agent of the sub-device" to the agent gateway, and sends a message "forbid to act as the agent of the sub-device" to at least one other gateway. The gateway receiving the message "allow to act as the agent of the sub-device" processes all subsequent related information of the sub-device, including information sent by the sub-device to the cloud server, information sent by the cloud server to the sub-device and so on. The gateway receiving the message "forbid to act as the agent of the sub-device" does not process the related information of the sub-device longer.

In the embodiment, the agent gateway for acting as the agent of the sub-device is determined from at least one gateway, the agent gateway processes all related information of the sub-device and the at least one other gateway would not process the related information of the sub-device. Compared to the way of transmitting messages by flooding, the amount of messages transmitted in the Bluetooth Mesh network may be greatly reduced and also the resource consumption of the server may be described.

In one embodiment, before determining the gateway for acting as the agent of the sub-device from the at least one gateway as the agent gateway, the method further includes receiving sub-device information sent by the at least one gateway, in which the sub-device information includes status information broadcasted by the sub-device and received by the at least one gateway.

In detail, the sub-device broadcasts its own information at fixed period. All the gateways may receive the information broadcasted by the sub-device. After receiving the information broadcasted by the sub-device, all the gateways send the received information to the cloud server. A broadcast period of the sub-device may be set according to actual requirements.

The status information of the sub-device may include for example position status information of the sub-device, switch status information of the sub-device, on/off-line status information of the sub-device and so on.

When the gateway and the sub-device perform communication through the Bluetooth Mesh protocol, the sub-device may broadcast its own information in a Bluetooth Low Energy (BLE) broadcast mode, or in a Mesh broadcast mode. When the gateway and the sub-device perform communication through the Zigbee protocol, Thread protocol or the like, the sub-device may broadcast its own information in a corresponding broadcast mode. In the following, the gateway and the sub-device perform the communication through the Bluetooth Mesh protocol, for example.

In one embodiment, when the sub-device broadcasts the status information in the BLE broadcast mode, the sub-device information further includes a signal intensity of the status information. Determining the gateway for acting as the agent of the sub-device from the at least one gateway as the agent gateway includes selecting a strongest signal intensity from all signal intensities and determining a gateway sending the strongest signal intensity as the agent gateway.

In detail, when all the gateways receive the status information broadcasted by the sub-device, the signal intensity of the status information, such as received signal strength indicator (RSSI) may be received simultaneously. All the gateways send the received status information of the sub-device and the corresponding signal intensity to the cloud server simultaneously, and the cloud server receives the status information of the sub-device and the corresponding signal intensity received by at least one gateway. Generally, the bigger the value of RSSI, the better the signal is. Thus, the gateway sending the biggest RSSI value is selected to act the agent of the sub-device. The cloud server selects the strongest signal intensity from all the received signal intensities, and determines the gateway sending the strongest signal intensity (i.e., the RSSI value is maximum) as the agent gateway to act as the agent of the sub-device.

In the embodiment, the gateway sending the strongest signal intensity is determined as the agent gateway, such that the signal transmitted between the gateway and the sub-device is better, and the transmission is steady and the transmission speed is fast.

In one embodiment, when the sub-device broadcasts the status information in the Mesh broadcast mode, determining the gateway for acting as the agent of the sub-device from the at least one gateway as the agent gateway includes selecting any gateway from the at least one gateway as the agent gateway.

In detail, when the sub-device broadcasts the status information in the Mesh broadcast mode, there is no corresponding RSSI, and any one of all the gateways may be selected as the agent gateway to act as the agent of the sub-device.

It should be noted that, when the sub-device broadcasts the status information in the Mesh broadcast mode, a small default value of RSSI can be set in the gateway receiving the sub-device information, and the gateway forwards the default value and the status information of the sub-device to the cloud server simultaneously. It should be understood that, when the gateway forwards the default value and the status information of the sub-device to the cloud server simultaneously, the broadcast mode of the sub-device may be forwarded to the cloud device simultaneously.

In one embodiment, when the sub-device broadcasts the status information in both the BLE broadcast mode and the Mesh broadcast mode, determining the gateway for acting as the agent of the sub-device from the at least one gateway as the agent gateway includes selecting a gateway receiving the status information broadcasted by the sub-device in the BLE broadcast mode from the at least one gateway as the agent gateway.

In detail, when the gateway receives the status information broadcasted by the sub-device in the BLE broadcast mode, it means that the sub-device is close to the gateway. When the gateway receives the status information broadcasted by the sub-device in the Mesh broadcast mode, it means that the sub-device is far away from the gateway. For the same sub-device, when the cloud server receives a report indicating that the received status information is broadcasted by the sub-device in the BLE broadcast mode from some gateways, and a report indicating that the received status information is broadcasted by the sub-device in the Mesh broadcast mode from some other gateways, the cloud server preferentially selects the gateway which reports that it receives the status information broadcasted by the sub-device in the BLE broadcast mode as the agent gateway to act as the agent of the sub-device.

It should be understood that, when there are at least two gateways which receive the status information broadcasted by the sub-device in the BLE broadcast mode, the method described in above embodiment is used to select the gateway with the strongest signal intensity as the agent gateway to act as the agent of the sub-device.

In one embodiment, a gateway for acting as the agent of the sub-device is determined from the at least one other gateway as a new agent gateway when an abnormal message from the agent gateway is received.

In detail, an abnormality of the gateway may include outage of the gateway, off-line of the gateway or other abnormality. When the agent gateway is abnormal, the cloud server may receive the abnormal message of the agent gateway. When the cloud server determines that the agent gateway is abnormal, a gateway may be randomly determined as the new agent gateway to act as the agent of the sub-device, or a gateway may be determined from the at least one other gateway using the method described in the above embodiment as the new agent gateway to act as the agent of the sub-device.

In the embodiment, when the agent gateway is abnormal, the cloud server may determine a gateway from the at least one other gateway as the new agent gateway, such that transmission failure due to abnormality of the agent gateway may be avoided.

Figure 2:
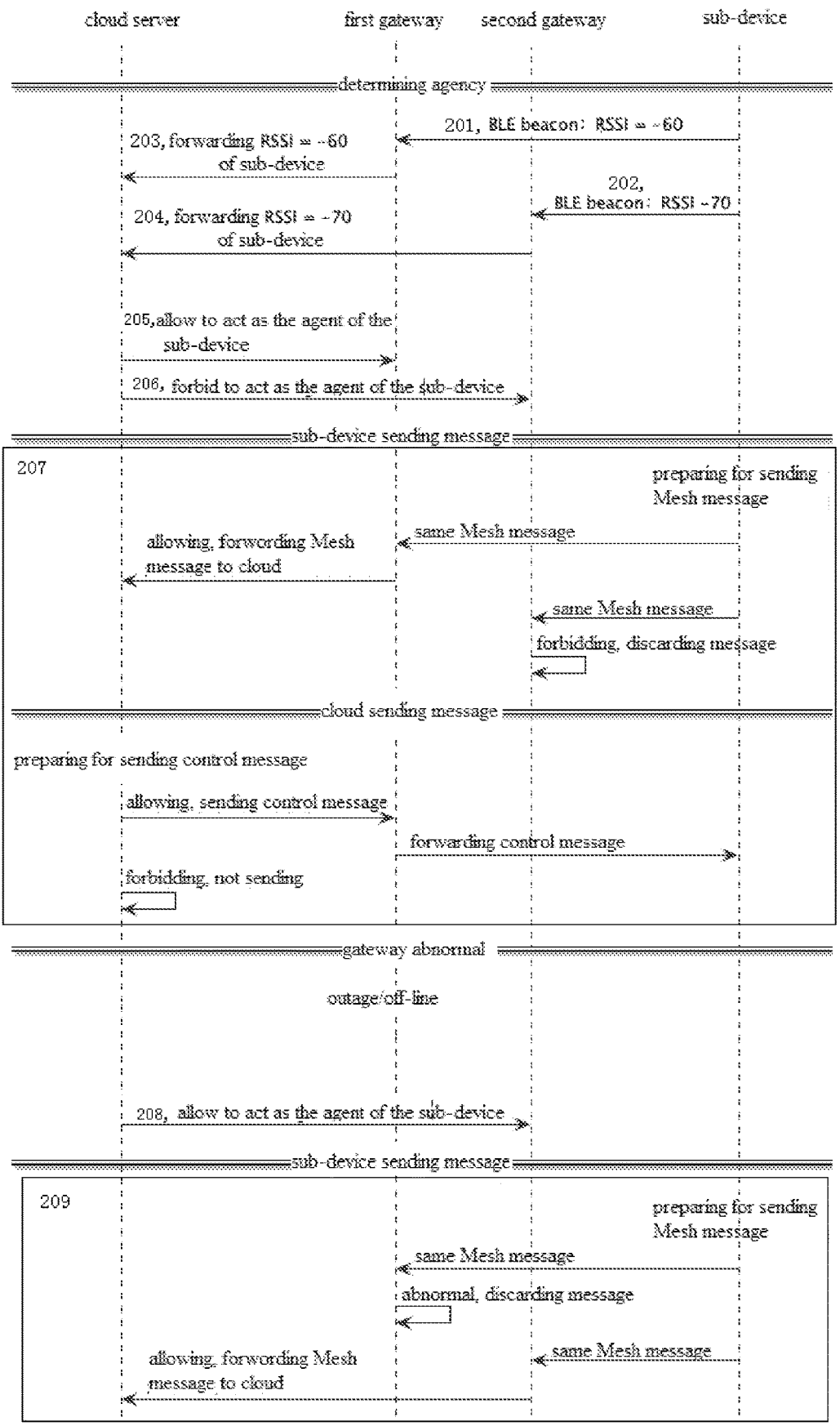
FIG. 2 is a schematic diagram illustrating an interactive process of a method for controlling a gateway according to an embodiment of the present disclosure.

The method for controlling a gateway will be further described with reference to FIG. 2 below. In FIG. 2, two gateways are shown, including a first gateway and a second gateway. A cloud server is taken as the server, and the sub-device broadcasts information in the BLE broadcast mode.

In FIG. 2, the sub-device broadcasts its own status information at fixed period.

When a gateway receives the status information broadcasted by the sub-device, the gateway may receive the RSSI value of the status information simultaneously. The first gateway receives the status information (beacon) of the sub-device and the corresponding RSSI=−60, as indicated by 201. The second gateway receives the status information of the sub-device and the corresponding RSSI=−70, as indicated by 201. The first gateway and the second gateway send the received status information of the sub-device and the corresponding RSSI value to the cloud server, respectively, as indicated by 203 and 204.

The cloud server receives the status information of the sub-device and the corresponding RSSI values sent by the two gateways, compares the received RSSI values, selects the maximum RSSI value (in this case −60, since −60>−70), and determines the gateway sending the RSSI value of −60 as the agent gateway (i.e., the first gateway is configured as the agent gateway).

The cloud sever sends the message "allow to act as the agent of the sub-device" to the first gateway, as indicated by 205, and sends the message "forbid to act as the agent of the sub-device" to the second gateway, as indicated by 206.

The first gateway processes all subsequent related information of the sub-device (such as Mesh information sent by the sub-device to the cloud server, control information sent by the cloud server to the sub-device and so on), and the second gateway does not process the related information of the sub-device longer, as indicated by 207, for example including the steps of the sub-device preparing the Mesh message and sending the same Mesh message to the first gateway and the second gateway, the first gateway forwarding the Mesh message to the cloud server, the second gateway discarding the Mesh message, the cloud server preparing the control message and sending the control message to the first gateway, the first gateway forwarding the control message to the sub-device.

When the first gateway is abnormal, the cloud server may receive a message indicating that the first gateway is abnormal, and the cloud server may determine the second gateway as the agent gateway, for example sending the message "allow to act as the agent of the sub-device" to the second gateway, as indicated by 208. Then, the second gateway processes all related information of the sub-device, as indicated by 209, the steps are similar to the steps for processing the all related information by the first gateway.

Figure 3:
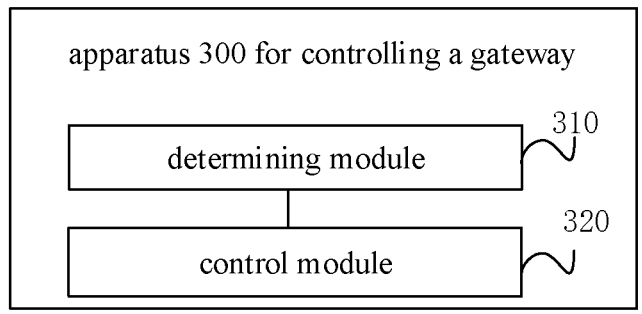
FIG. 3 is a block diagram of an apparatus for controlling a gateway according to an embodiment of the present disclosure.

FIG. 3 is a block diagram of an apparatus 300 for controlling a gateway according to an embodiment of the present disclosure. As illustrated in FIG. 3, the apparatus may implement the method shown in FIG. 1, and the apparatus may include a determining module 310 and a control module 320.

The determining module 310 is configured to determine a gateway for acting as an agent of a sub-device from at least one gateway as an agent gateway.

The control module 320 is configured to control the agent gateway to act as the agent of the sub-device by sending a first control instruction to the agent gateway and forbid the at least one other gateway to act as the agent of the sub-device by sending a second control instruction to at least one other gateway.

Alternatively, the apparatus further includes a receiving module configured to receive sub-device information sent by the at least one gateway, in which the sub-device information includes status information broadcasted by the sub-device and received by the at least one gateway.

Alternatively, when the sub-device broadcasts the status information in a Bluetooth Low Energy (BLE) broadcast mode, the sub-device information further includes a signal intensity of the status information. The determining module 310 is further configured to select a strongest signal intensity from all signal intensities and determine a gateway sending the strongest signal intensity as the agent gateway.

Alternatively, when the sub-device broadcasts the status information in a Mesh broadcast mode, the determining module 310 is further configured to select any gateway from the at least one gateway as the agent gateway.

Alternatively, when the sub-device broadcasts the status information in both a BLE broadcast mode and a Mesh broadcast mode, the determining module 310 is further configured to select a gateway receiving the status information broadcasted by the sub-device in the BLE broadcast mode from the at least one gateway as the agent gateway.

Alternatively, the apparatus further includes a processing module configured to determine a gateway for acting as the agent of the sub-device from the at least one other gateway as a new agent gateway when receiving an abnormal message from the agent gateway.

The apparatus provided in the foregoing embodiment may implement the above method embodiments and has the same principle and technical effects, which will not be elaborated here.

A system for controlling a gateway is provided, including a sub device, at least one gateway and a server.

The sub-device is configured to broadcast its own status information.

The at least one gateway is configured to receive the status information broadcasted by the sub-device and forward the status information to the server.

The server is configured to determine a gateway for acting as an agent of the sub-device from the at least one gateway as an agent gateway, control the agent gateway to act as the agent of the sub-device by sending a first control instruction to the agent gateway and forbid the at least one other gateway to act as the agent of the sub-device by sending a second control instruction to at least one other gateway.

Figure 4:
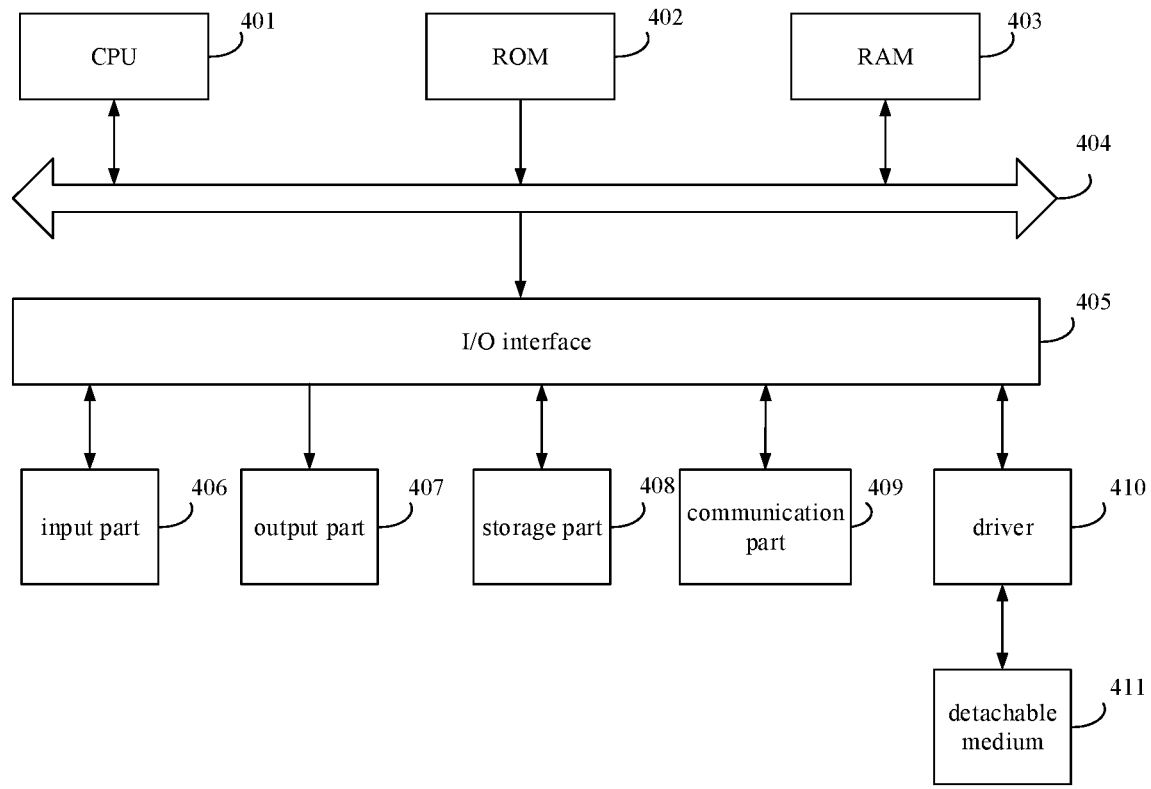
FIG. 4 is a block diagram of an electronic device according to an embodiment of the present disclosure.

FIG. 4 is a block diagram of an electronic device according to an embodiment of the present disclosure. As illustrated in FIG. 4, a structure of the electronic device 400 applicable to implement the embodiments of the present disclosure is shown.

As illustrated in FIG. 4, the electronic device 400 includes a central processing unit (CPU) 401, which may execute various suitable actions and operations based on programs stored in a read-only memory (ROM) 402 or programs loaded from a storage part 408 to a random access memory (RAM) 403. In the RAM 403, various programs and data required for operations of the electronic device 400 are further stored. The CPU 401, ROM 402, and RAM 403 are connected to each other via a bus 404. An input/output (I/O) interface 405 is also connected to the bus 404.

The following parts are connected to the I/O interface 405, an input part 406 including a keypad, a mouse and so on, an output part 407 including a cathode-ray tube (CRT), a liquid crystal display (LCD), a speaker and so on, a storage part 408 including a disk and so on, a communication part 409 including a network interface card, such LAN card, modem and so on. The communication part 409 performs communications via the network such as Internet. A driver 410 is also connected to the I/O interface 406 according to requirements. A detachable medium 411, such as a magnetic disk, an optic disk, a magnetooptical disk, a semiconductor memory and so on may be installed on the driver 410 according to requirements, such that the computer programs read therefrom may be installed into the storage part 408 according to requirements.

Particularly, according to the embodiment of the present disclosure, the process described with reference to FIG. 1 may be implemented as computer software programs. For example, the embodiment of the present disclosure includes a computer program product, which includes tangible computer programs stored on the machine readable medium. The computer programs include program codes configured to perform the above method for controlling a gateway. In such embodiment, the computer programs may be downloaded and installed from the network through the communication part 409 and/or from the detachable medium 411.

The structure, functions and operations of the system, method and computer program product according to embodiments of the present disclosure are illustrated in the drawings. It will be understood that, the flow chart or any process or method described herein in other manners may represent a module, segment, or portion of code that comprises one or more executable instructions to implement the specified logic function(s) or that comprises one or more executable instructions of the steps of the progress. Although the flow chart shows a specific order of execution, it is understood that the order of execution may differ from that which is depicted. For example, the order of execution of two or more boxes may be scrambled relative to the order shown. Also, two or more boxes shown in succession in the flowchart may be executed concurrently or with partial concurrence, which depends on their functions. Each box in the flowchart and/or block diagram, and a combination of boxes in the flowchart and/or block diagram may be embodied in a system based on dedicated hardware for executing specified functions or operations, or may be embodied in a combination of computer instructions and dedicated hardware.

The units or modules described in the embodiments may be realized by software or by hardware. The described units or modules may also be disposed in a processor. These units or modules are not limited by their designations in some cases.

As another aspect, the present disclosure further provides a storage medium. The storage medium may be any storage medium contained in the above described apparatus in the embodiment, or may be a storage medium which is stand-alone and not loaded into the apparatus. The storage medium stores one or more programs, which are executed by one or more processors to perform the method for controlling a gateway according to the embodiment of the present disclosure.

In these descriptions and drawings, some specific approaches of the embodiments of the present disclosure are provided, so as to show some ways to perform the principle of the embodiments of the present disclosure, however it should be understood that the embodiment of the present disclosure is not limited thereby. Instead, the embodiments of the present disclosure comprise all the variants, modifications and their equivalents within the spirit and scope of the present disclosure. For example, the technical solution may be formed by interchanging the above features and other features with the similar functions provided (but not limited) in the present disclosure.

What is claimed is:

1. A method for controlling a gateway, comprising:
receiving sub-device information sent by at least one gateway, wherein the sub-device information includes status information broadcasted by a sub-device and received by the at least one gateway;
determining a gateway for acting as an agent of the sub-device from the at least one gateway as an agent gateway; and
controlling the agent gateway to act as the agent of the sub-device by sending a first control instruction to the agent gateway and forbidding at least one other gateway to act as the agent of the sub-device by sending a second control instruction to the at least one other gateway; wherein the agent gateway processes all related information of the sub-device and the at least one other gateway does not process the related information of the sub-device;
wherein, when the sub-device broadcasts the status information in both a BLE broadcast mode and a Mesh broadcast mode, determining the gateway for acting as the agent of the sub-device from the at least one gateway as the agent gateway comprises:
selecting a gateway receiving the status information broadcasted by the sub-device in the BLE broadcast mode from the at least one gateway as the agent gateway.

2. The method of claim 1, wherein the sub-device information comprises at least one of:
position status information of the sub-device,
switch status information of the sub-device, and
on/off-line status information.

3. The method of claim 1, wherein when the sub-device broadcasts the status information in a Bluetooth Low Energy (BLE) broadcast mode, the sub-device information further includes a signal intensity of the status information;
wherein determining the gateway for acting as the agent of the sub-device from the at least one gateway as the agent gateway comprises:
selecting a strongest signal intensity from all signal intensities; and
determining a gateway sending the strongest signal intensity as the agent gateway.

4. The method of claim 1, wherein when the sub-device broadcasts the status information in a Mesh broadcast mode, determining the gateway for acting as the agent of the sub-device from the at least one gateway as the agent gateway comprises:
selecting any gateway from the at least one gateway as the agent gateway.

5. The method of claim 1, wherein when the sub-device broadcasts the status information in a Bluetooth Low Energy (BLE) broadcast mode, the sub-device information further includes a signal intensity of the status information;
wherein selecting the gateway receiving the status information broadcasted by the sub-device in the BLE broadcast mode from the at least one gateway as the agent gateway comprises:
selecting a strongest signal intensity from all signal intensities; and
determining a gateway sending the strongest signal intensity as the agent gateway.

6. The method of claim 1, further comprising:
determining a gateway for acting as the agent of the sub-device from the at least one other gateway as a new agent gateway when receiving an abnormal message from the agent gateway.

7. A system for controlling a gateway, comprising at least one gateway and a server;
wherein, the at least one gateway is configured to receive status information broadcasted by a sub-device and forward the status information to the server;
the server is configured to:
receive sub-device information sent by the at least one gateway, wherein the sub-device information includes status information broadcasted by the sub-device and received by the at least one gateway;
determine a gateway for acting as an agent of the sub-device from the at least one gateway as an agent gateway, control the agent gateway to act as the agent of the sub-device by sending a first control instruction to the agent gateway and forbid at least one other gateway to act as the agent of the sub-device by sending a second control instruction to the at least one other gateway; wherein the agent gateway processes all related information of the sub-device and the at least one other gateway does not process the related information of the sub-device;

wherein, when the sub-device broadcasts the status information in both a BLE broadcast mode and a Mesh broadcast mode, the server is configured to:

select a gateway receiving the status information broadcasted by the sub-device in the BLE broadcast mode from the at least one gateway as the agent gateway.

8. The system of claim 7, wherein when the sub-device broadcasts the status information in a Bluetooth Low Energy (BLE) broadcast mode, the sub-device information further includes a signal intensity of the status information;

wherein the server is configured to:

select a strongest signal intensity from all signal intensities; and determine a gateway sending the strongest signal intensity as the agent gateway.

9. The system of claim 7, wherein when the sub-device broadcasts the status information in a Mesh broadcast mode, the server is configured to:

select any gateway from the at least one gateway as the agent gateway.

10. The system of claim 7, wherein the server is further configured to:

determine a gateway for acting as the agent of the sub-device from the at least one other gateway as a new agent gateway when receiving an abnormal message from the agent gateway.

11. An electronic device, comprising:

a processor;

a memory; and computer program stored in the memory that, when executed by the processor, cause the processor to perform a method comprising:

receiving sub-device information sent by at least one gateway, wherein the sub-device information includes status information broadcasted by a sub-device and received by the at least one gateway;

determining a gateway for acting as an agent of a sub-device from the at least one gateway as an agent gateway; and controlling the agent gateway to act as the agent of the sub-device by sending a first control instruction to the agent gateway and forbidding at least one other gateway to act as the agent of the sub-device by sending a second control instruction to the at least one other gateway; wherein the agent gateway processes all related information of the sub-device and the at least one other gateway does not process the related information of the sub-device;

wherein, when the sub-device broadcasts the status information in both a BLE broadcast mode and a Mesh broadcast mode, determining the gateway for acting as the agent of the sub-device from the at least one gateway as the agent gateway comprises:

selecting a gateway receiving the status information broadcasted by the sub-device in the BLE broadcast mode from the at least one gateway as the agent gateway.

12. The electronic device of claim 11, wherein when the sub-device broadcasts the status information in a Bluetooth Low Energy (BLE) broadcast mode, the sub-device information further includes a signal intensity of the status information;

wherein determining the gateway for acting as the agent of the sub-device from the at least one gateway as the agent gateway comprises:

selecting a strongest signal intensity from all signal intensities; and determining a gateway sending the strongest signal intensity as the agent gateway.

13. The electronic device of claim 11, wherein when the sub-device broadcasts the status information in a Mesh broadcast mode, determining the gateway for acting as the agent of the sub-device from the at least one gateway as the agent gateway comprises:

selecting any gateway from the at least one gateway as the agent gateway.

14. The electronic device of claim 11, wherein the method further comprises:

determining a gateway for acting as the agent of the sub-device from the at least one other gateway as a new agent gateway when receiving an abnormal message from the agent gateway.

* * * * *